United States Patent

[11] 3,624,274

[72] Inventors  Shigeru Araki;
               Masao Inaba, both of Tokyo, Japan
[21] Appl. No. 750,970
[22] Filed     Aug. 7, 1968
[45] Patented  Nov. 30, 1971
[73] Assignee  Nippon Electric Company Limited
               Tokyo, Japan
[32] Priority  Aug. 11, 1967
[33]           Japan
[31]           42/51509

[54] APPARATUS FOR DETECTING THE PHASE
     DIFFERENCE BETWEEN A PLURALITY OF
     SIGNALS AND COLOR-SHADING COMPENSATOR
     MEANS EMPLOYING SUCH APPARATUS
     9 Claims, 5 Drawing Figs.

[52] U.S. Cl. .................................................. 178/5.4 R,
                              178/54 CD, 307/295, 328/155
[51] Int. Cl. ....................................................... H04n 5/78
[50] Field of Search ......................................... 178/5.4
              CD, 5.4 AC, 5.2 A; 328/109, 133, 155, 234;
                                        307/232, 295; 333/18

[56]             References Cited
              UNITED STATES PATENTS
3,347,997  10/1967  Woodruff ..................... 179/100.25
3,225,134  12/1965  Jensen .......................... 178/5.4 CR
3,428,745   2/1969  Coleman, Jr. et al. ........   178/6.6 A Primary Examiner—Robert L. Griffin
Assistant Examiner—Donald I. Stout
Attorney—Marn & Jangarathis ABSTRACT: A method and the apparatus for detecting the phase difference between a pair of signals is provided wherein the DC phase difference is deleted from the output and only the AC phase difference is present therein. According to one embodiment of this invention, circuit apparatus is provided wherein a first signal whose phase is to be compared with a second signal is applied to a first input of phase comparator means. The second signal of the pair is applied to the input of variable phase shift circuit means whose output furnishes the second input for the phase comparator means. The amount of phase shift that is introduced to the second signal, to thereby remove the DC phase difference from the output of the apparatus for detecting the phase difference, is determined by the output of the phase comparator means as modified by a frequency selective circuit.

APPARATUS FOR DETECTING THE PHASE DIFFERENCE BETWEEN A PLURALITY OF SIGNALS AND COLOR-SHADING COMPENSATOR MEANS EMPLOYING SUCH APPARATUS

The invention relates to phase comparison methods and apparatus and more particularly to a method and the apparatus for detecting the phase difference between a plurality of alternating or pulsating signals.

When the phase of two alternating or pulsating electric signals are compared, the resultant waveform, representative of the phase difference, will comprise a DC component and an AC component. In such a waveform, the DC component or DC phase difference will manifest little if any variation with time while the AC component or AC phase difference clearly varies with time.

Conventional phase difference detector circuits utilized for obtaining a detector output which is proportional to the phase difference between signals have often used a detection technique wherein one of the signals is converted to a triangular, saw-toothed or trapezoidal wave, and the sloped portion of such a converted wave is sampled by means of sampling pulses produced by shaping the other signal to be compared. In such conventional circuits, where high precision is desired, it becomes necessary to reduce the period of sampling so that a closer comparison can be made. However, if the period of sampling in such circuits is reduced, where in the usual manner the AC phase component is superimposed on the DC phase component, the high precision sought will often be lost because the sampling points will not always occur at the requisite center position of the sloped portion of the wave sampled. Thus, where high precision phase difference detection is required, the AC phase difference or component standing alone and not superimposed on the DC phase difference or component is often necessitated.

Therefore, it is an object of the present invention to provide a method for detecting the AC phase difference standing alone and not superimposed on the DC phase difference in phase difference detector apparatus whose general mode of operation is similar to that described above.

A further object of this invention is to provide highly sensitive phase difference detector apparatus which acts to remove the DC phase difference and thereby narrow the range within which the operating point for phase difference detection varies, consequently enabling an increase in the sampling frequency to that necessary for high precision.

A further object of the present invention is to provide color shading compensator apparatus incorporating the instant phase difference detector apparatus for use in conjunction with video tape recorders.

Various other objects and advantages of the invention will become clear from the following detailed description of the embodiments disclosed herein, and the novel features will be particularly pointed out in connection with the appended claims.

In accordance with the invention, a method and apparatus therefore are provided for high precision detection of the AC phase difference by the automatic adjustment of the sampling phase to the proximity of the center position of the sloped portion of the waveform to be sampled.

The invention will be more clearly understood by reference to the following detailed description of several embodiments thereof in conjunction with the accompanying drawings in which.

Figure 1:
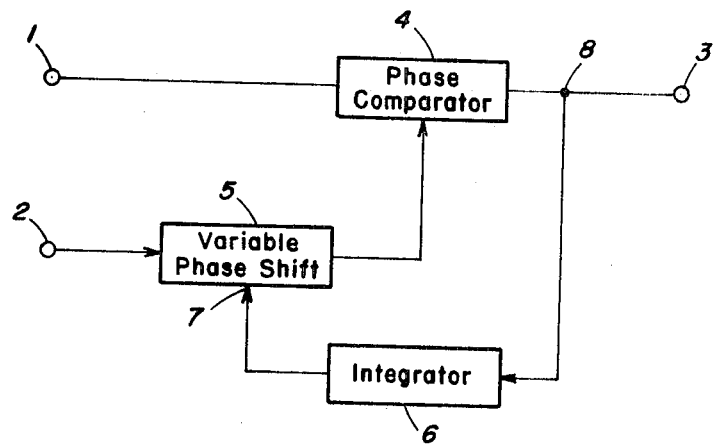
FIG. 1 is a schematic diagram depicting a first embodiment of the present invention.

Referring now to the drawings and more particularly to FIG. 1 thereof, there is shown a schematic block diagram of a first embodiment of the present invention. The apparatus shown in FIG. 1 comprises a pair of input terminal means 1 and 2 for the application of the separate signals having a phase difference therebetween which is to be determined, phase comparator circuit means 4 of the type commonly in use today and output terminal means 3. The first input terminal means 1 is connected directly to a first input of the phase comparator circuit means 4 whose output is connected to the output terminal means 3. The second input terminal means 2 is connected to the input of a variable phase shift circuit means 5 whose output is applied to the second input thereto. The variable phase shift circuit means 5, which may consist, for example, of a variable delay line employing a variable capacitance element or any other well-known form of variable phase shift circuit, introduces a phase shift to the signals applied to its input whose magnitude is determined by the control signals applied to its control input 7. The control signals applied to the control input 7 are derived at junction terminal 8 from the output of the phase comparator circuit means 4 and applied via a frequency selective circuit means 6 which may be an integrator circuit, as indicated, or a DC amplifier in serial combination with a low pass filter. The method and mode of operation of the embodiment of this invention as shown in FIG. 1 will be made apparent in conjunction with FIG. 2 which is an equivalent circuit therefor wherein the input and output signals as well as the transfer function have been represented after Fourier transformation.

Figure 2:
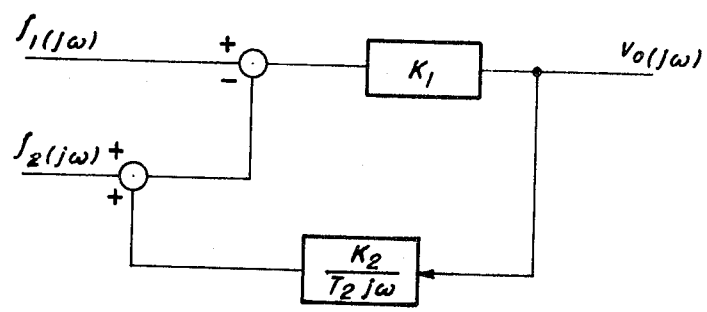
FIG. 2 is an equivalent circuit of the embodiment of this invention depicted in FIG. 1.

In the FIG. 2 equivalent circuit for the embodiment of this invention shown in FIG. 1, $f_1(j\omega)$ and $f_2(j\omega)$ are the phases of the signals for which the phase difference is to be detected where $j$ represents the imaginary operator and $\omega$ is the angular frequency. Further, the phase-voltage conversion factor of the phase comparator circuit means 4 is represented as $k_1$, the time constant of the integrator 6 is represented as $T_2$, the voltage-phase conversion factor of the variable phase shift circuit means 5 is represented as $k_2$ and the output signal of the phase difference detector apparatus according to the invention is shown as $v_0(j\omega)$. The output for the FIG. 2 circuit in terms of the above-defined parameters may then be written as:

$$(1) \qquad v_0(j\omega) = \frac{k_1}{1 + \frac{k_1 k_2}{T_2} \cdot \frac{1}{j\omega}} [f_1(j\omega) - f_2(j\omega)]$$

This equation may be further simplified if the following substitutions are made:

$$T = \frac{T_2}{k_1 k_2}, \text{ and } \Delta f(j\omega) = f_1(j\omega) - f_2(j\omega)$$

If these substitutions are made and the terms of the resulting equation are rearranged, the initial equation reduces to:

$$(2) \qquad v_0(j\omega) = k_1 \times \frac{j\omega T}{1 + j\omega T} \Delta f(j\omega)$$

which defines the mode of operation of the FIG. 1 embodiment of the present invention. As can be seen by inspection of equation (2), if $\omega$ becomes small, the value of $v_0$ approaches zero thus making it evident that the DC component as well as low-frequency components having a frequency substantially lower than $f = \frac{1}{2\pi T}$ are removed from the output 3 of the phase comparator circuit apparatus. The upper limit of the low-frequency components, which are removed from the output of the phase comparator circuit apparatus, may be readily selected by proper choice of an appropriate value for the time constant of the integrator 6. Therefore, as the DC and low-frequency components are absorbed by the circuit elements external to the phase comparator means, the operational region of the phase comparator apparatus may be effectively utilized for high frequency signal components whose frequencies exceed $f = \frac{1}{2\pi T}$.

Thus it will be seen that the method and the apparatus for detecting only the AC phase difference has been provided in accordance with the objectives of this invention. Further, it should be noted that although the described embodiment provided variable phase shift means for only one of the input signals to the phase comparator circuit means, the provision of variable phase shift means for each of the input signals is specifically contemplated as it is merely an obvious design alternative from that illustrated in FIG. 1.

Figure 3:
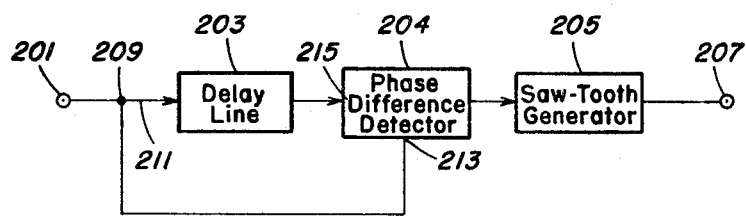
FIG. 3 is a schematic diagram of a second embodiment of this invention.

Phase difference detector apparatus according to the instant invention, although of general application, find particular utility when used in color shading compensator apparatus according to this invention such as that depicted in the FIG. 3 embodiment. When color television video signals of the type defined by the NTSC system are reproduced by video tape recording and reproduction apparatus such as the four-head video recorder systems presently in use, color shading may often be observed. Such color shading normally manifests itself in a color change in the pattern of horizontal bands which each generally comprise fifteen (15) to seventeen (17) lines. The cause of such color shading is generally attributed to such factors as a variation of the relative velocity of the magnetic tape and the relative position of the magnetic heads, expansion or contraction of the magnetic tape, and a multitude of other factors which may take place between the recordation of the video signal and the reproduction of the same. These factors thus modify or otherwise change the horizontal period of the reproduced signal thereby resulting in variation in the length of the horizontal line derived therefrom. As color shading, as defined above, has an unpleasant effect on viewers thereof, color shading compensator apparatus is necessary to electronically correct such distortions in the reproduced signal. The mode of operation of such color shading compensator apparatus as well as that of prior art apparatus will be explained in conjunction with FIG. 4.

Figure 4:
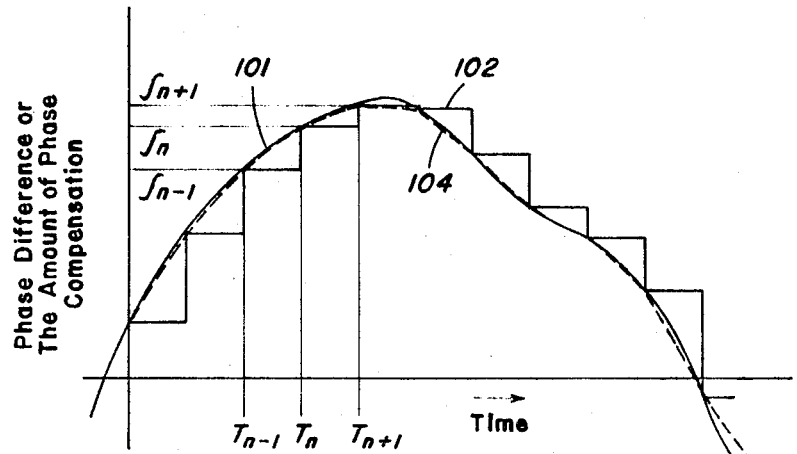
FIGS. 4 and 5 are graphical representations useful in the explanation of the operation of the FIG. 3 embodiment.

The curve 101 in the graphic representation of FIG. 4 is indicative of the amount of phase variation with time of a video signal as reproduced by video recording and reproducing apparatus and hence is representative of the amount of compensation required or the phase difference from a reference signal at any instant of time. The stepped curve 102 in FIG. 4 is representative of the corrective signal applied by prior art phase stabilizer circuits, as found in typical color television video recording and reproducing apparatus, for stabilizing the phase of the reproduced color signal when the phase difference between a reproduced signal and a reference signal was as depicted in curve 101. Further, $f_{n-l}$, $f_n$, and $f_{n+l}$ are phase differences with respect to a reference phase which phase differences are present at times $T_{n-l}$, $T_n$, and $T_{n+l}$, where $T_{n-l}$, $T_n$, and $T_{n+l}$ represent the times of the ($n-1$)th the $n$th, and the ($n+1$)th sampling respectively. In addition, although generally a number of sampling operations are carried out within the burst period of one scanning line of a video signal, the burst period in FIG. 4 is represented by a single sampling operation as the phase variation within this period is small and this representation substantially simplifies the discussion which follows.

As can be seen by an inspection of FIG. 4, the phase stabilizer circuits commonly found in prior art video recording and reproducing apparatus completely compensated the phase variation of the reproduced video signal at the sampling times, i.e. $T_{n-l}$, $T_n$, and $T_{n+l}$, however, during the intervals therebetween the phase difference was not detected but instead, the previously applied correction was maintained until the next sampling time. Thus between sampling times incorrect compensation was applied and the uncompensated phase difference tended to maximize at the instant of time just prior to the next succeeding sampling time. This manner of compensation tended to manifest itself at the color television receiver in that the variation in the length of the horizontal scanning lines was not adequately compensated because although the left side of the raster was corrected, since the left portions of the horizontal scanning lines are proximate the sampling position, the right side of the raster had substantial color shading as these portions of the horizontal scanning lines are proximate the maximum error positions.

Figure 5:
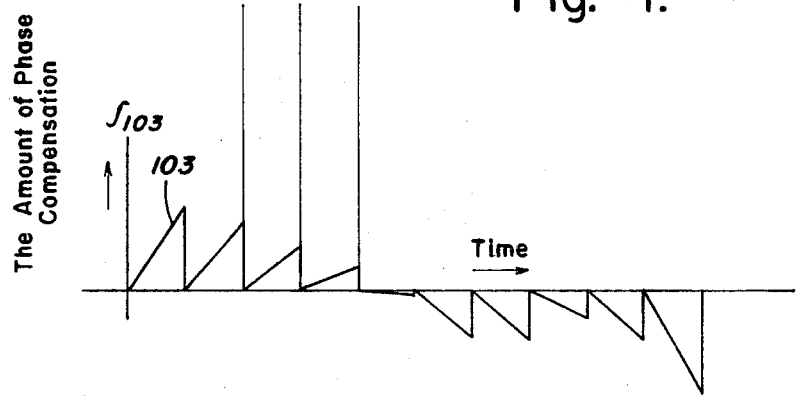

The color shading compensator apparatus according to this invention is designed to carry out phase compensation along a polygonal curve such as that shown by the dashed curve 104 as plotted in FIG. 4. This is accomplished in a manner to be explained hereinafter by adding a first order compensation approximation, as shown by the curve 103 in FIG. 5, to the stepped curve correction 102, as shown in FIG. 4, to achieve a closer overall correction whose maximum error position is not consistently along one portion of the color raster. The waveform 103 in FIG. 5 shows the amount of phase compensation to be added to the stepped compensation curve 102 of FIG. 4 by the color shading compensation apparatus according to the instant invention. The curve 103 may be represented during the interval $T_{n-l} \leq T < T_n$ by the following equation where $f_{103}$ equals the phase compensation to be added during the interval:

(3)
$$f_{103} = [T - _{n-1}] \times \frac{f_n - f_{n-1}}{T_n - T_{n-1}}$$
$$[T_{n-1} \sim T_n]$$

Further, since the waveform 104, as shown in FIG. 4, is equal during the aforementioned interval to the sum of $f_{103}$ during this interval and $f_{n-l}$, the curve 104 may be represented by the equation:

(4)
$$f_{104} = f_{n-1} + [T - T_{n-1}] \times \frac{f_n - f_{n-1}}{T_n - T_{n-1}}$$
$$[T_{n-1} \sim T_n]$$

where $f_{104}$ is the amount of phase compensation at time T as defined by the inequality $T_{n-l} \leq T < T_n$. Thus it will be seen that by adding a first order compensation approximation signal to the corrective compensation signal relied upon by the prior art, the variation in the length of the horizontal scanning lines may be compensated over the entire area of the raster to thereby achieve a reproduced color video signal which is substantially free from color shading which might offend the sensitivity of a viewer.

One embodiment of the apparatus according to this invention for achieving the results graphically illustrated in curve 103 of FIG. 5 is illustrated in FIG. 3; it being understood at the outset that curve 104 of FIG. 4 may thereafter be simply and easily achieved by merely adding the output of this apparatus to that of the above-described prior art stabilizer circuits which yielded curve 102, as shown in FIG. 4. The embodiment of the color shading compensation apparatus according to this invention as depicted in FIG. 3 comprises an input terminal means 201 adapted to receive burst signals derived from the signal to be compensated in phase, delay line means 203 adapted to introduce a delay equal to one horizontal period to signals applied thereto, phase difference detector apparatus 204 according to this invention whose method and mode of operation is the same as that described with regard to FIGS. 1 and 2, sawtooth generator means 205 adapted to generate a sawtooth waveform whose slope is proportional to the input signals applied thereto, and an output terminal means 207.

The input terminal means 201 is connected to the junction terminal 209 so that received burst signals derived from the signal to be compensated in phase are applied directly to both the input of the delay line means 203 over conductor means 211 and to an input 213 of the phase difference detector apparatus 204. The delay line means 203 is adapted in the well-known manner to apply a time delay of one horizontal period to signals applied thereto and the output thereof is applied to another input terminal 215 of the phase difference detector apparatus 204 which may take the form depicted in FIG. 1, wherein for example terminals 215 and 213 in FIG. 3 correspond to terminals 1 and 2, respectively in FIG. 1. The output of the phase difference detector apparatus 204, which as previously explained consists only of the AC phase difference, is applied to the input of the sawtooth generator means 205 which sawtooth generator means 205 presents at its output and hence terminal 207, in the well-known manner, a sawtooth waveform whose slope is proportional to the output of the phase difference detector means 204 connected to its input. The sawtooth generator means 205 may take the form of a ramp generator such as illustrated in U.S. Pat. No. 3,428,745, as issued to C. H. Coleman, Jr. et al. on Feb. 18, 1969, or any other conventional form of such device well known to those of ordinary skill in the art.

In operation, it will be seen that due to the delay of one horizontal period introduced by the delay line means 203 to the received burst signals presented at junction terminal 209, input terminal 215 of the phase difference detector apparatus 204 will receive an applied signal at time $n$ while the applied signal at input terminal 213 of the phase difference detector apparatus 204 will receive such signals at time $n-1$. Thus, as should be apparent from the above-described operation of the FIG. 1 embodiment of this invention, the output of the phase difference detector apparatus 204 will comprise a signal proportional to $f_n - f_{n-1}$ with any associated DC component $f_d$ removed. Therefore, the output signal of the phase difference detector apparatus 204 as illustrated in FIG. 1 may be represented as proportional to $f_n - f_{n-1} - f_d$ and this signal is applied to the input of the sawtooth generator means 205. The sawtooth generator means 205, in the well-known manner, produces an output, sawtooth waveform whose slope is proportional to $f_n - f_{n-1} - f_d$ which output is applied to output terminal 207 for use in the elimination of the color shading of the reproduced signal. Thereafter, the output signal in the form of a sawtooth waveform is subjected to a voltage-phase conversion, which may be represented by the following equation:

(5)
$$f_{105} = [T - T_{n-1}] \times \frac{f_n - f_{n-1}}{T_n - T_{n-1}} - [T - T_{n-1}] \times \frac{f_d}{T_n - T_{n-1}}$$

The first term in equation (5) corresponds to equation (3) and as such is representative of the waveform 103 depicted in FIG. 5 which is, as previously mentioned, a first order compensation approximation calculated to eliminate the color shading. The second term is the DC component being removed by the phase-difference detector apparatus according to the invention. This removal of the DC component results in a color variation which is slowly propagated from left to right across the picture derived therefrom. However, as this color variation is negligible when compared to color shading which produces horizontal stripes that correspond to the AC phase difference, it is hardly detectable by observers. Thus the signal as defined by equation (5) may be simply and expeditiously added to the output of the prior art phase stabilizing circuit to achieve a waveform approaching that depicted by curve 104 in FIG. 4.

When the embodiment of this invention as depicted in FIG. 3 is used in conjunction with an NTSC color transmission system wherein a 3.58 MC/S subcarrier is used for transmission of color information, the precision of the phase correction applied by the color shading compensator apparatus may be maximized by several samplings of the triangular wave representing the color burst which has a repetition frequency of 3.58 MC. Although, under these conditions, the operational range of the phase comparator circuit means is narrowed as a result of the increase in the precision detection achieved by raising the sampling frequency, the phase difference detector apparatus according to the present invention will furnish the precise first order compensation approximation signals despite large phase variations. This occurs because the described apparatus always functions to bring the operating point to the center of the operational range of the phase comparator circuit means. Furthermore, even if the delay introduced by the delay line means should vary from the design value of one horizontal period, due to environmental temperature changes, a stable compensation signal may still be achieved. Thus it will be seen that advantageous color shading compensator apparatus has been provided in accordance with the objects of this invention.

While the invention has been described in connection with two specific embodiments thereof, it will be understood that many modifications will be readily apparent to one of ordinary skill in the art; and that this application is intended to cover any adaptations or variations thereof. Therefore, it is manifestly intended that this invention be only limited by the claims and the equivalents thereof.

What is claimed is:

1. Apparatus for detecting the phase difference between a pair of input signals, said apparatus comprising:
   a pair of input terminal means, each terminal means of said pair being disposed to receive one of said pair of input signals;
   phase comparator means for providing an output signal indicative of the phase difference between signals applied as inputs thereto;
   means for connecting one of said pair of input terminal means as an input to said phase comparator means;
   variable phase shift circuit means, said variable phase shift circuit means being capable of introducing a time delay to signals applied thereto, said variable phase shift circuit means including at least input means, control terminal means, and output means;
   means for connecting the other of said pair of input terminal means to the input means of said variable phase shift circuit means;
   means for connecting the output means of said variable phase shift circuit means to said phase comparator means as another input thereto; and
   means for applying control signals to said control terminal means of said variable phase shift circuit means, said last-named means including frequency selective means interposed between the output of said phase comparator means and said control terminal means of said variable phase shift circuit means for applying the low frequency components present in said output signal of said phase comparator means to said control terminal means to thereby control the amount of delay introduced by said variable phase shift circuit means.

2. The apparatus of claim 1 wherein said frequency selective means comprises electronic integrator means.

3. The apparatus of claim 1 wherein said frequency selective means comprises DC amplifier means in serial combination with low pass filter means.

4. The apparatus of claim 1 wherein said variable phase shift circuit means includes variable delay line means employing a variable capacitance means.

5. The apparatus of claim 4 wherein said frequency selective means comprises electronic integrator means.

6. The apparatus of claim 1 further comprising:
   delay line means for receiving an input signal including at least color burst signals of color video signals for introducing thereto a delay substantially equal to one horizontal scanning period of said color video signals;
   means for applying said input signal to one of said pair of input terminal means;
   means for applying the output of said delay line means to the other of said pair of input terminal means; and
   sawtooth generator means connected to the output of said phase comparator means, said sawtooth generator means serving to generate a compensation increment proportional to said phase difference.

7. The apparatus of claim 6 wherein said frequency selective means comprises DC amplifier means in serial combination with low pass filter means.

8. The apparatus of claim 6 wherein the waveform generated by said sawtooth generator means has a slope proportional to the input signals applied thereto.

9. The apparatus of claim 6 wherein said frequency selective means comprises electronic integrator means.